United States Patent
Helbo Nygaard

(10) Patent No.: US 10,949,979 B2
(45) Date of Patent: Mar. 16, 2021

(54) METHOD FOR DETECTING A CONDITION OF A PUMP ASSEMBLY

(71) Applicant: GRUNDFOS HOLDING A/S, Bjerringbro (DK)

(72) Inventor: Michael Helbo Nygaard, Viborg (DK)

(73) Assignee: GRUNDFOS HOLDING A/S, Bjerringbro (DK)

(*) Notice: Subject to any disclaimer, the term of this patent is extended or adjusted under 35 U.S.C. 154(b) by 280 days.

(21) Appl. No.: 15/856,601

(22) Filed: Dec. 28, 2017

(65) Prior Publication Data

US 2018/0189962 A1 Jul. 5, 2018

(30) Foreign Application Priority Data

Dec. 30, 2016 (EP) .................................. 16207452

(51) Int. Cl.
*G06T 7/207* (2017.01)
*F04D 15/00* (2006.01)
*F04D 29/66* (2006.01)
*G06K 9/62* (2006.01)

(52) U.S. Cl.
CPC .......... *G06T 7/207* (2017.01); *F04D 15/0088* (2013.01); *F04D 15/0094* (2013.01); *F04D 29/669* (2013.01); *G06K 9/6202* (2013.01); *F05D 2260/80* (2013.01); *F05D 2270/8041* (2013.01); *G06T 2207/10016* (2013.01); *G06T 2207/20016* (2013.01)

(58) Field of Classification Search
CPC ............. F04D 15/0088; F04D 15/0094; F04D 27/001; F04D 29/668; G06T 7/207; G06T 2207/10016; G06T 2207/20016
See application file for complete search history.

(56) References Cited

U.S. PATENT DOCUMENTS

| 8,292,501 B1 | 10/2012 | Stein | |
| 2005/0122397 A1* | 6/2005 | Henson | H04N 7/181 348/143 |
| 2006/0013568 A1* | 1/2006 | Rodriguez | H04N 5/765 386/219 |

(Continued)

FOREIGN PATENT DOCUMENTS

| CN | 105651377 A | 6/2016 |
| JP | 2006/194656 A | 7/2006 |

(Continued)

OTHER PUBLICATIONS

Synergys Technologies, VSHOOTER Vibration Analysr—MCP Creation, YouTube (Sep. 15, 2016), http://youtube.com/watch?v=UtT_xpp2HzQ (Year: 2016).*

(Continued)

*Primary Examiner* — Patrick Hamo

(74) *Attorney, Agent, or Firm* — McGlew and Tuttle, P.C.

(57) ABSTRACT

A video sequence of a pump assembly or of a pump assembly part is produced. The video sequence is evaluated by way of digital signal processing assisted by a data base. A condition of the pump assembly is determined by way of this evaluation. In particular it is determined whether the pump runs in a designated manner or it is determined whether unallowably high oscillations are ascertained in a region, wherein this would indicate a defect, for example bearing damage or an unfavorable speed.

20 Claims, 4 Drawing Sheets

(56) References Cited

U.S. PATENT DOCUMENTS

| | | | | |
|---|---|---|---|---|
| 2010/0054957 A1* | 3/2010 | Goetze | ............... | F04D 27/001 417/53 |
| 2010/0276224 A1* | 11/2010 | Wei | ............... | G01V 1/047 181/121 |
| 2012/0111114 A1* | 5/2012 | Emde | ............... | F04D 15/0094 73/579 |
| 2013/0169799 A1* | 7/2013 | Hoelzl | ............... | G06T 7/0004 348/135 |
| 2014/0305732 A1* | 10/2014 | Tulett | ............... | G01V 1/0475 181/112 |
| 2016/0300341 A1* | 10/2016 | Hay | ............... | G06F 3/005 |
| 2017/0138171 A1* | 5/2017 | Richards | ............ | E21B 47/0002 |

FOREIGN PATENT DOCUMENTS

| | | |
|---|---|---|
| JP | 2014-016199 A | 1/2014 |
| WO | 2014-026787 A1 | 2/2014 |
| WO | 2017/070629 A1 | 4/2014 |
| WO | 2016/059112 A1 | 4/2016 |

OTHER PUBLICATIONS

Ki-Sung Son et al: "Vibration displacement measurement technology for cylindrical structures using camera images", Nuclear Engineering and Technology, Bd. 47, Nr. 4, Mar. 27, 2015 (Mar. 27, 2015), pp. 488-499.

Ki-Sung Son et al., "Vibration displacement measurement technology for cylindrical structures using camera images" Nuclear Engineering and Technology, vol. 47 Journal 4 (pp. 488-499) Mar. 27, 2015.

\* cited by examiner

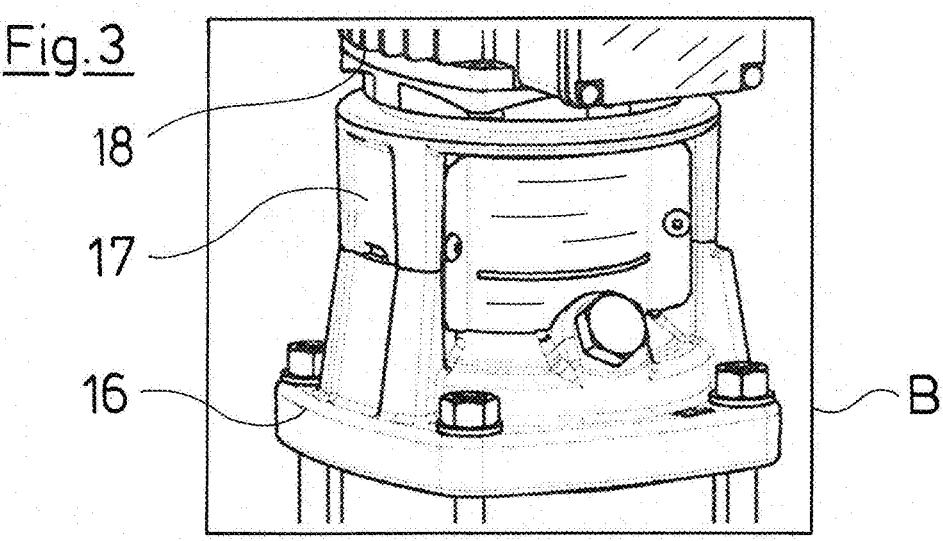
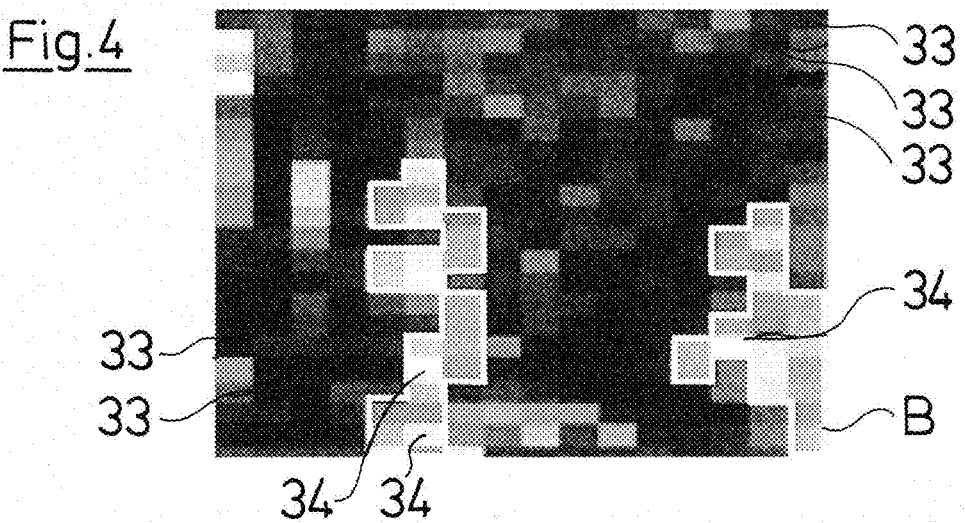
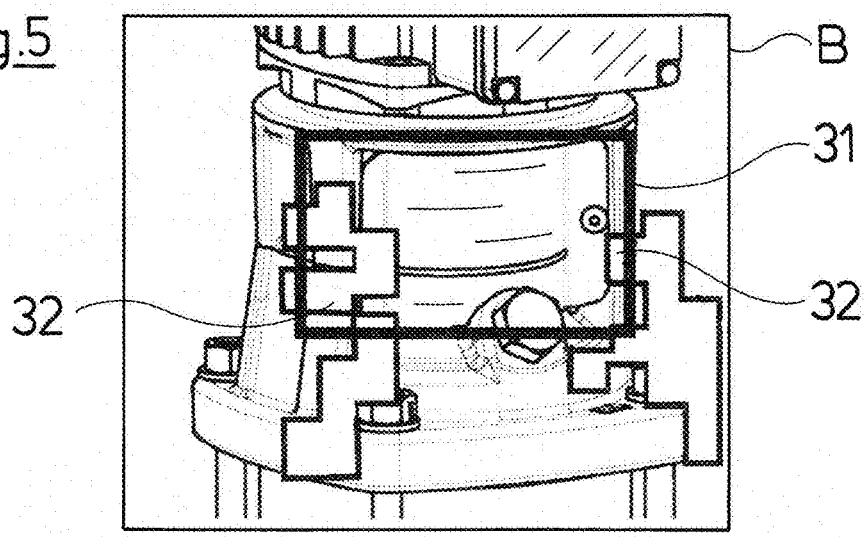

METHOD FOR DETECTING A CONDITION OF A PUMP ASSEMBLY

CROSS REFERENCE TO RELATED APPLICATIONS

This application claims the benefit of priority under 35 U.S.C. § 119 of European Application 16 207 452.0, filed Dec. 30, 2016, the entire contents of which are incorporated herein by reference.

FIELD OF THE INVENTION

The invention relates to a method for detecting a condition of a pump assembly.

BACKGROUND OF THE INVENTION

It is not only in medical technology that one strives to recognize occurring errors as early as possible by way of taking certain precautionary measures, in order to deal with such errors to an improved extent, but the same also applies to the field of machines, and in particular to pump assemblies which are discussed here. Whereas in the past, the exchange of a heating circulation pump assembly was not carried out until e.g. a defect occurred, i.e. given a standstill of the pump, nowadays one strives to detect the condition of the pump assembly, and with this, also possible condition changes, by way of regular monitoring, in order to renew parts of the pump assembly or the pump assembly itself, in good time, before a defect leads to the failure of the pump and, with this, mostly of the complete facility.

As in WO 2016/059112 A1, it is counted as belonging to the state of the art, to acoustically detect the condition of a pump assembly, for example of a heating circulation pump. A common smartphone which processes the acoustic data by way of signal processing and examines this data with regard to occurring anomalies or errors can be used for the recording. Bearing damage or cavitation within the pump for example can be detected with the known methods. The advantage of this acoustic error analysis during operation of the pump assembly lies in the fact that the service technician can examine the pump assembly with regard to errors during its running operation, without special sensor devices and without a complicated test set-up.

However, the disadvantage of this method is the fact that it cannot be carried out, or at least not with the demanded reliability, in environments filled with noise.

SUMMARY OF THE INVENTION

Against this background, it is an object of the present invention, to provide an alternative or additional method for detecting a condition of a pump assembly, which does not have the above-mentioned disadvantages, but which in practice can be carried out in a simple manner and without much effort with regard to construction.

According to the invention, this object is achieved by the method according to the invention, for detecting a condition of a pump assembly or of a part of a pump assembly. The method comprises the two basic method steps, specifically the recording of a video sequence of the pump assembly or at least parts thereof, in running operation, and the subsequent determining of the condition of the pump assembly or of the part thereof, on the basis of changes in pictures of the video sequence.

The basic concept of the present invention is to carry out an optical analysis of the pump assembly or of the part of this which is of interest, instead of the known acoustic analysis or additionally to this. With the method according to the invention, it is determined as to how the pump assembly or the part thereof which is of interest moves/oscillates at its surface, by means of a suitable signal processing of a video sequence, thus of a number of successive individual pictures, in order to deduce information on the condition of the pump assembly on the basis of these movements.

The method according to the invention is envisaged for detecting the condition on running operation of the pump assembly. Since it is based on the pictures of video sequence, it can only extend to the surface regions of the assembly, for example to the pump casing, the motor casing, the motor stool, the coupling between the motor shaft and the pump shaft or the like. The method according to the invention is basically suitable for detecting the condition of each and every conceivable pump assembly, and particularly advantageously can be applied with single-stage or multi-stage centrifugal pumps which are driven by an electric motor which is controllable or closed-loop controlled with regard to its speed, thus which typically comprises a power converter/frequency converter for the activation.

A pump assembly in the context of the present invention is to be understood as a fluid pump, in particular a single-stage or multi-stage centrifugal pump which is driven by a motor, in particular an electric motor, wherein the motor and the pump are either connected to one another by a common shaft or by way of a coupling, a transmission or another drive device. A pump assembly in the context of the present invention can also be formed by a number of pump assemblies which are connected in parallel for example and which are activated by a common, super-ordinate control, as is the case with booster pumps for example.

Movements at the surface are detected by way of recording a video sequence of the operating pump assembly or a part of this, wherein these movements permit information concerning the conditions of the pump assembly, in particular critical conditions, as occur given a wearing of components and during operation in regions which are critical regarding resonance, and the like.

Thereby, the changes in pictures of the video sequence are advantageously determined by way of digital picture processing, as will yet be described in more detail hereinafter.

As a very essential criterion for characterizing the condition, according to the invention, one envisages determining the speeds of changes between pixels or pixel groups of successive pictures of the video sequence and carrying out the determining of the condition of the pump assembly on the basis of the determined speeds of changes. Thereby, directly consecutive pictures of the video sequence are typically evaluated. However, individual pictures or, as the case may be, also picture groups can also be skipped, which however should be taken into consideration with computation regarding time. It is to be assumed that the temporal parameters of the video sequence (exposure time of each picture) as well as the temporal interval between successive pictures is known. Very surprisingly, it has been found that speeds of changes in pictures of the video sequence provide valuable information concerning the condition of a pump assembly.

Thereby, it is advantageous to group the pixels or pixel groups and to spatially assign them in a grouped manner, in accordance with their determined speed of changes. By way of this assignment and on the basis of the determined speeds of changes, it is possible to characterize and thus to finally be able to represent which surface regions of the pump assembly are particularly movement-intensive, in a later picture which is similar to a map, and with this, to determine where the largest oscillation amplitudes occur, from which information concerning bearings, wear and loading of the pump assembly can be directly or indirectly drawn.

Surprisingly, it has been found that values or value regions and which represent a certain condition, can be determined on the basis of the speed of changes of successive pictures, which is a measure of the oscillations in respective surface regions of the pump assembly. According to a further development of the invention, one therefore envisages comparing determined speeds of changes and their spatial assignment to values stored in a data base and determining the condition of the basis of this comparison, by means of the data base. Thereby, it is advantageous if it is the case of a cloud-based data base, since these values, for example via the internet, are then available worldwide for a comparison and for determining the condition.

Thereby, limit values can be set for certain operating conditions or regions, so that with the comparison, one can determine whether and where predefined speed values are exceeded. These can then be advantageously displayed on a display, so that the service technician entrusted with the examination of the respective pump assembly immediately sees where these critical regions lie and which mechanical or electronic remedial measures are possible for this.

The method according to the invention is implemented in a particularly practical and resource-efficient manner using a mobile computer, typically a smartphone or a tablet computer, with which the recording of the video sequence as well as the transfer of the recorded data to a data base server is effected. Smartphones and tablets nowadays have high-performance picture recording devices, as well as radio connection, be it WLAN or mobile radio communication or also wire-connected, in order to communicate with networks, in particular the internet. They therefore have all requirements, in order to realize a transfer (transmission) to a data base server which is preferably cloud-based, so that this can be accessed via a mobile computer, e.g. via the internet, from almost very location. Thereby, the mobile computer is usefully provided with a software application which is designed for the method according to the invention, runs on a computer for carrying out the method and instructs/guides the user through the individual method steps, which the computer then implements in a largely automatic manner. The display of the mobile computer should advantageously be used for representing the condition display. Computation operations for determining the condition can selectively take their course on the mobile computer or on the data base server or both, depending of the computation capability.

This relates to the determining of the speeds of the changes of the pictures of the video sequence, as well as their spatial assignment and also their evaluation based on the data base.

It is particularly advantageous with the method according to the invention, if at least one picture of the pump assembly to be examined or of the region of this pump assembly which is to be analyzed, is taken before or during the recording of the video sequence, and used on the data base side for determining the pump assembly type, by way of a comparison with picture data acquired on the data base side being effected. Such an automated comparison has the significant advantage that the relevant values/limit values of the respective pump assembly type can be determined on the data base side without inputting the type description, serial number and the like, and can be used for the further course of the method when determining the condition.

Alternatively or additionally, it is thereby advantageous if the pump assembly type and/or a region of the pump assembly which is to be analyzed is inputted by way of the mobile computer before recording the video sequence. Thus for example one can envisage a manual input of the pump assembly type being able to be additionally effected if the picture comparison leads to no result or to an unambiguous result concerning the pump type, or, if the pump assembly type, although having been able to be determined on the data base side, a certain region of the pump assembly, whose condition is to be analyzed, is specified by way of a suitable input. It is particularly with pump assemblies of a larger construction type, with which a single-stage or multi-stage centrifugal pump is arranged in a pump casing connected via a coupling to an electric motor, that it is useful to characterize which of the three regions (pump, coupling, motor) is to be examined. This also applies to booster pumps, in order to characterize which of the individual pump assemblies is to be examined.

Thereby, according to an advantageous further development of the method according to the invention, after ascertaining the pump assembly type and/or the region to be analyzed, on the data base side, the predefined speeds and the frequency filters for the picture processing which are useful in this regard can be determined and provided for the further signal processing as well as for determining the condition.

The digital picture processing of the video sequence can be effected in any suitable manner which permits the determining of the condition with a realizable computation effort, be it on the mobile computer and/or on the server side. However, a digital picture processing of the pictures of the video sequence, with which one or more of the follows steps is effected, has also been found to be particularly advantageous:

It is useful to firstly convert the electrical signal representing the video sequence into a YUV signal and then moreover to use the luminance signal Y for further analysis. YUV signal processing is widespread, robust and can be realized in a technically inexpensive manner, wherein Y stands for the luma component (the brightness) and U and V are the chrominance (color) components. Thereby, the data volume can already be significantly reduced, i.e. by the extent of the color information, by way of the application of the luminance signal Y.

It has also been found to be advantageous to apply the Gaussian pyramid or the Gaussian-Laplacian pyramid to individual pictures used for analysis, in order to then further reduce the pixel quantity of each individual picture. The data volume can be significantly reduced with comparatively little computation effort by way of the application of the Gaussian pyramid or Gaussian-Laplacian pyramid. High frequencies which contain the smallest share of information with regard to the evaluation are removed by way of data compression. It is to be understood that this could also be effected with other methods, for example Fourier transformation.

According to the method according to the invention, it is then advantageous to provide a band-pass filtering of the individual pictures after the data reduction, and the video sequence is thus advantageously led to a band-pass filtering after the data reduction.

Advantageously, the optical flux as well as the determining of the speed of the changes, thus of the optical flux, between successive pictures is specifically determined not until after the data reduction of these pictures/signals. This can advantageously be effected by way of the Lucas-Kanade method, which is referred to here only by way of example. This method can also be realized with comparatively little computation effort and is largely insensitive with regard to noise and picture defects.

Finally, a picture of the pump assembly or of the region of the pump assembly which is to be analyzed, is produced in accordance with the determined speeds whilst taking into account their spatial assignment, and this picture is advantageously displayed on a display or however can also be stored on the server side or the pump assembly side. Thereby, the picture regions, in which the predefined speed is exceeded, are rendered particularly recognizable, for example by way of a red highlighting of the picture which is otherwise only represented in tones (shades) of grey. The person skilled in the art then directly recognizes the problem concerning the displayed picture regions, for example whether a shaft bearing is defect or system resonances reducing the efficiency are present.

Despite the fact that the mentioned picture processing methods are extremely robust, however it is advantageous to examine the video sequence with regard to the spatial consistency (agreement) of its pictures, before the picture processing, in order to output a signal for the repetition of the recording of the video sequence on the mobile computer in the case of a lack of consistency. It can therefore be useful to apply a stand (tripod) for recording to video sequence. It is also advantageous to apply optical and/or electronic picture stabilization, in order to rule out blurring of the pictures in the case of an unfavorable lighting. It can also be useful to record the video sequence with an additional lighting, as is present on modern smartphones nowadays. The higher the picture frequency, i.e. the more pictures are taken per second, the greater is the information content of the video sequence. However, the recording time and with this, the light quantity which gets onto the chip reduces with an increasing number of pictures. An additional lighting or illumination on recording the video sequence will then always have a positive effect with regard to the information content of the video sequence.

According to an advantageous further development of the method according to the invention, a data-base-assisted signal for a changed setting of the pump assembly and/or for the replacement of components is outputted after the effected condition detection and the determining of at least one region, in which the predefined speed of the change is exceeded. It is to be understood that in this case, the data base not only needs to comprise the limit values for the speed, but also specific speed patterns which are correlated to faults, be they bearing faults or setting errors, so that in practice, an error analysis can be effected with the hint as to which settings are to be changed or which components are to be replaced. Thus for example a resonance error can be reduced by way of the pump assembly no longer being operated in this resonant region, which is to say by way of the speed being changed.

Advantageously, not only is a picture sequence recorded during the recording of the video sequence, but also the sound, and a determining of the condition of the pump assembly is additionally produced by way of evaluating the sound sequence. WO 2016/059112 A1, in which this is described in detail, is referred to in this context (and is incorporated by reference in its entirety). It is to be understood that with regard to this, the video and sound recording do not necessarily have to be effected simultaneously. It is particularly with frequency-selective recordings, as are described in the above-mentioned document, that it can also be necessary to successively carry out several sound recordings of the pump assembly during its operation. It is particularly with the use of a smartphone or tablet that such an additional sound evaluation can be effected practically without additional technical effort.

The method according to the invention is advantageously repeated in temporal intervals, wherein the respectively determined speed values are stored, so that not only is the absolute condition of the pump assembly detected by means of the current evaluation but also the change in condition over time.

The method according to the invention can advantageously be carried out in an application-controlled manner whilst using the digital camera which is integrated into the smartphone, but is not limited to this. The higher the recording frequency, the more detailed the condition evaluation becomes. Vibrations of up to 120 Hz can be detected and analyzed given a video sequence of 240 pictures per second. This corresponds to a speed range of up to 7,200 revolutions per minute. Almost all usually occurring errors can be analyzed in this range.

The invention is hereinafter explained in more detail by way of one embodiment example. The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is a view of a picture of a video sequence of a selected region;

FIG. 4 is a view of a map of the speed distribution which is determined on the basis of the video sequence in accordance with the speed changes;

FIG. 5 is a view of a picture which is viewable on the display after completion of the method, taking into account the predefined values and spatial assignment.

DESCRIPTION OF THE PREFERRED EMBODIMENTS

Figure 1:
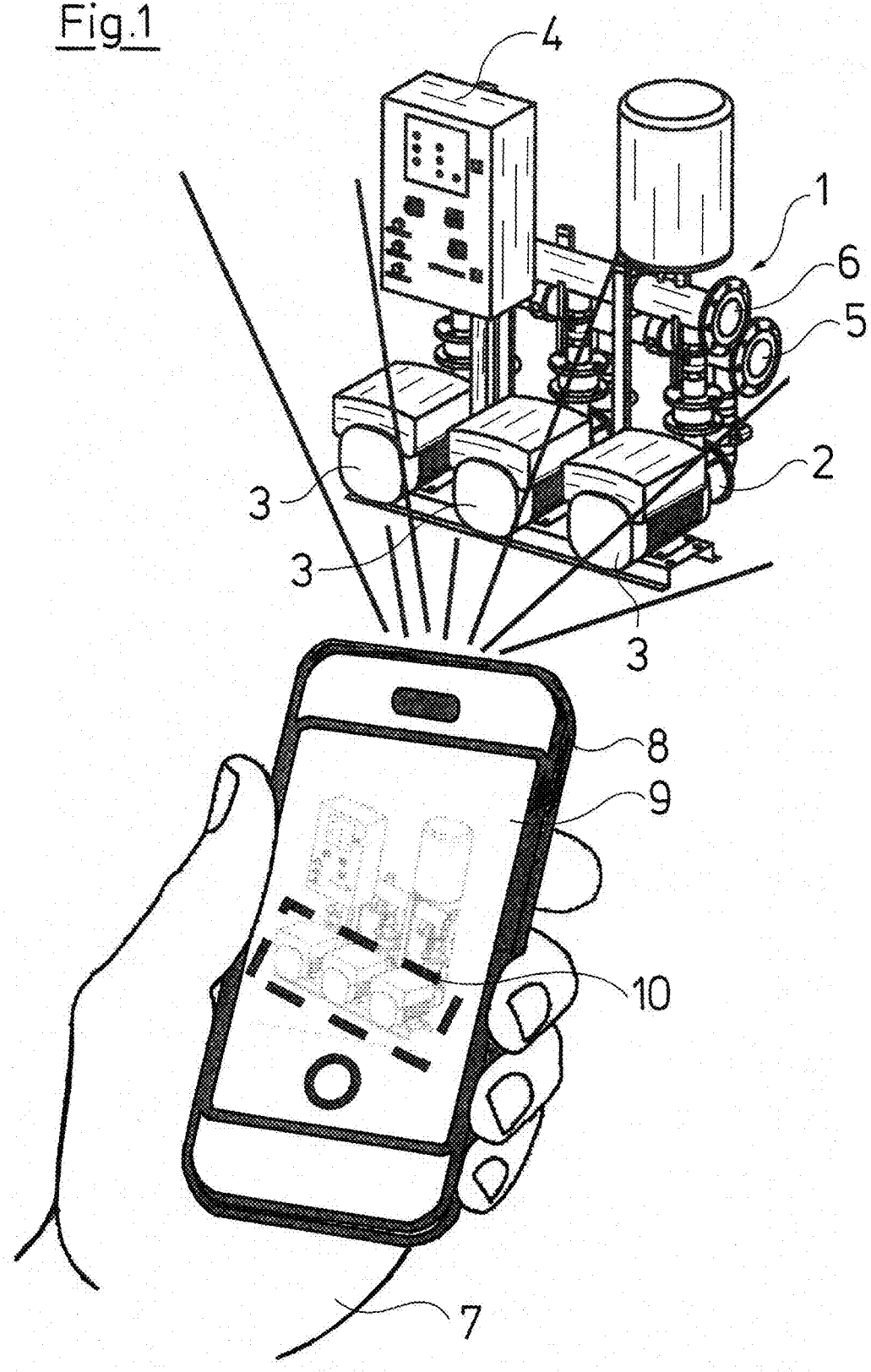
FIG. 1 is a greatly schematized representation of the application of the method according to the invention to a booster pump by way of a smartphone.

Referring to the drawings, the method according to the invention is explained hereinafter by way of example, wherein the method steps are specified in detail in the procedural diagram according to FIG. 6. As to how the method according to the invention can be carried out for example is represented by way of FIG. 1. A pump assembly 1 to be examined, in the represented embodiment a booster pump, consists of three centrifugal pumps 2 which are connected in parallel and which are driven in each case by an electric motor 3 controlled by frequency converter. A super-ordinate control 4 connects or disconnects the centrifugal pumps 2 delivering from a common suction conduit 5 into a delivery conduit 6, according to the requirements.

In order to determine the condition of this pump assembly 1 consisting of three individual assemblies, an operating person 7, of whom only the hand is represented in FIG. 1, operates a smartphone 8, on which a software application envisaged for this purpose is firstly started, wherein in this software application, the operating person 7 is first of all prompted to take a picture of the pump assembly 1 by way of the smartphone 8. This smartphone is connected to a cloud-based data base of a server by way of a radio connection of the smartphone (WLAN, Bluetooth, mobile radio communication 3G, 4G, 5G etc.), said server analyzing and identifying the transmitted picture of the pump assembly 1 by way of a picture data base, and then prompts the marking of a part of the pump assembly 1 which is to be examined and which is formed in FIG. 1 by the electric motors 3 marked on the display 9 of the smartphone 8. This selected region 10 is now looked at for further determining the condition, wherein firstly a video sequence of this region of the pump assembly 1 is recorded by way of the smartphone 8 and for further processing is transferred via the cloud-based network to the server, said server processing and analyzing the transmitted video sequence whilst accessing the data stored in the data base, and displaying the result on the display 9.

Figure 2:
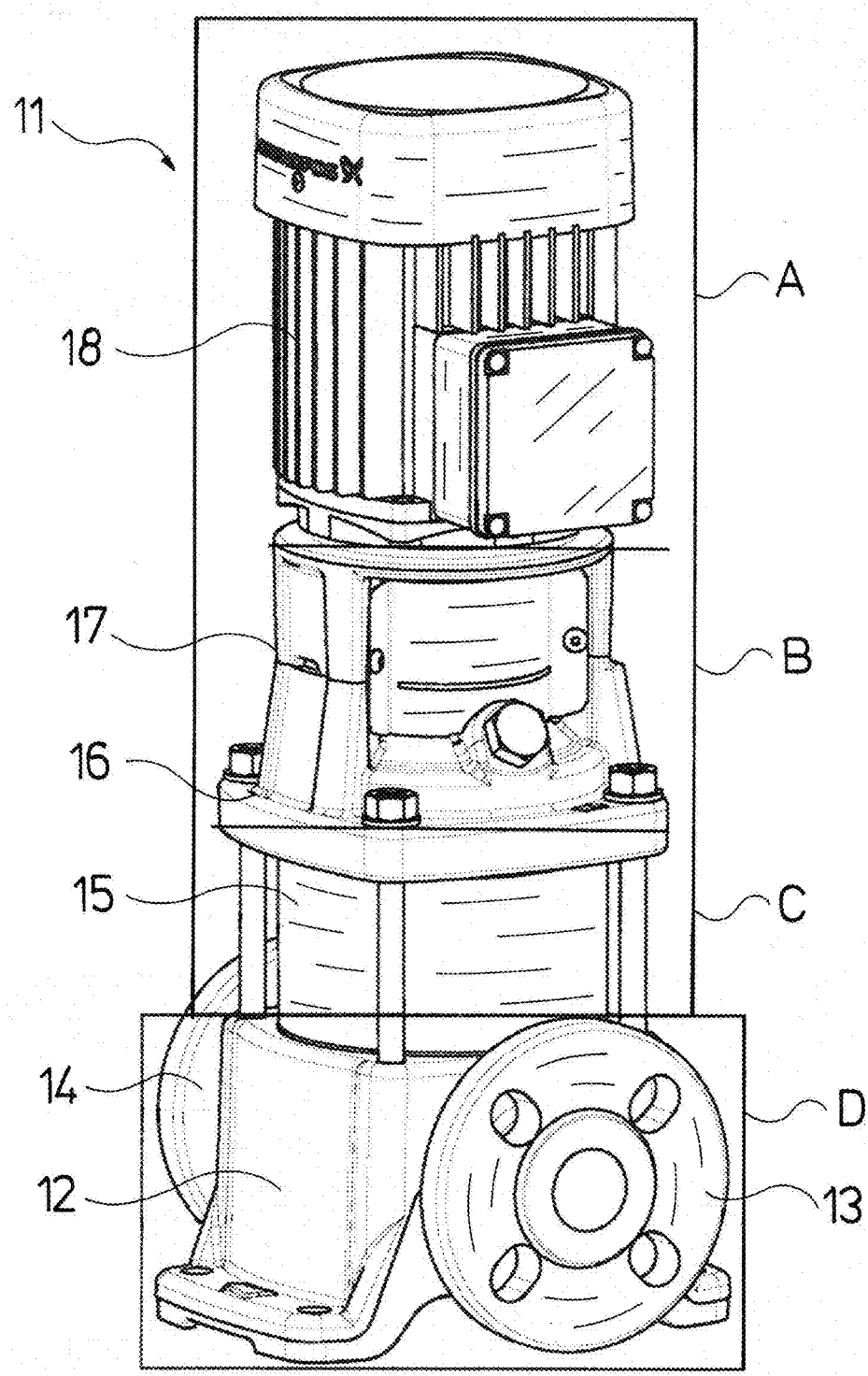
FIG. 2 is a greatly simplified perspective lateral view of a multi-stage inline centrifugal pump with a flanged-on drive motor, divided into four regions.

As to how this procedure is effected in detail in the case of a pump assembly 11 represented in FIG. 2, is explained hereinafter by way of the procedural diagram according to FIG. 6.

With regard to the pump assembly according to FIG. 2, it is the case of a multi-stage centrifugal pump of the inline construction type, with a vertical shaft arrangement, as is marketed by the applicant under the type description CR in various construction sizes. This pump assembly 11 comprises a pump foot 12 which supports the complete assembly and stands on the ground. An inlet conduit connection 13 as well as an outlet conduit connection 14 is integrated in the foot 12.

An essentially cylindrical pump part 15 which receives the pump stages and is closed off to the top by a pump head 16 connects onto the pump foot 12 to the top, said pump head being designed as a motor stool 17 and at its upper side being designed for receiving an electric motor 18. The cylindrical pump part 15 comprising the pump stages is clamped between the pump head 16 and the pump foot 12 by way of tie rods. A shaft is rotatably mounted within this pump part 15, and this shaft receives the impellers of the pump stages (not represented) and its upper end is sealingly led through the pump head 16, where this end is drivingly connected to the downwardly pointing end of the shaft of the electric motor 18, by way of a coupling arranged in the region of the motor stool 17. Such a pump assembly is divided for example into four regions A, B, C and D, for the condition analysis with the method according to the invention, wherein the region A comprises the electric motor 18, the region B the motor stool 17, the region C the cylindrical pump part 15 with the pump stages located therein, and the part D the pump foot 12 with the conduit connections 13 and 14. The method according to the invention, for detecting the condition of the pump assembly 11 or a part thereof, is now explained below by way of example and by way of this pump assembly 11.

The suitable software application on the smartphone 8 is firstly started, said application in a first step 20 prompting the user 7 to switch on the pump assembly 11 or to confirm that the pump assembly 11 is running. As soon as this has been effected on the operator side, a request 21 is effected, in which the operator 7 can specify whether an automatic recognition of the pump assembly is to be implemented by way of the smartphone or by way of a manual input. After the manual input 22 of the pump assembly type, for example by way of inputting the serial number, the smartphone 8 via the network communicates with the cloud-based data base for identifying the pump assembly and then prompts the user 7 to specify a region of the pump assembly 11, a condition of which is to be examined. The operator 7 can now select between the regions A to D and after selection of one of these regions is prompted to make a video sequence of this region of the running pump assembly. This step is characterized at 23 in the diagram according to FIG. 6.

If the operator 7 decides on the automatic recognition with the request 21, then in step 25 he is prompted by way of the software application, to take a picture or a video sequence of the complete pump assembly 11 or a part thereof, thus of one of the regions A to D, with the help of his smartphone 8, and this picture or video sequence is the evaluated on the network side via picture recognition assisted by data base, and the result is transferred to the smartphone 8. If the complete pump assembly 11 has been photographically covered by way of the smartphone 8, be it as an individual photo or a short video sequence, then the regions A to D of the pump assembly 11 are displayed to the operator 7 on the display, in order for him to select which of these regions A to D is to be examined. After the selection of the respective region, analogously to step 23, the operator 7 in step 25 is now prompted to make a video sequence of this part A, B, C or D of the pump assembly 11. If the user 7 has already specified only a part A, B, C or D of the pump assembly 11 with the automatic recognition, then the region selection can be done away with in the case of a corresponding identification of the pump assembly 11 and one of the regions A to D.

The operator 7 is now prompted to make a video sequence of a defined duration, e.g. 5 to 10 seconds, of the region to be examined, which has been previously selected at B. This video sequence of the region B (corresponding to FIG. 3) of the pump assembly 11 and which is recorded by the smartphone 8, acquires the region which encompasses the motor stool 17 and in which the ends of the motor shaft and the pump shaft are drive-connected by way of a coupling. In a step 26, this video sequence is transferred to the server by way of the smartphone 8 and the internet-based network. The data which is stored in the data base is applied, which concerns this pump assembly type and the selected region, and the server then transmits the frequency regions occurring in this case, as well as the regionally dependent, maximally permissible speeds for changes in this region. Thus in step 27, the video sequence transferred to the server is firstly reduced in its data quantity by way of suitable digital picture processing, in order in step 28 to create a map concerning the speed distribution. This map is represented in FIG. 4 and comprises groups of pixels, to which the same grey tone is assigned. Each grey tone represents an average speed change of these pixel groups. This means that the speed of the change is at its lowest where the black fields 33 are present in FIG. 4, whereas white fields 34 represent the picture parts where the speed of the change between the pictures is at its greatest, i.e. where the greatest optical flux could be determined between successive pictures of the video sequence and thus the largest movement amplitude at the surface in the region B (corresponding to FIG. 3) of the pump assembly 11.

This step 27, in which the digital picture processing processes the video sequence such that the map according to FIG. 4 can be created in step 28, is effected for example by way of the signal representing the video sequence—inasmuch as it has not yet been effected—being converted into a YUV signal, with which the luminance signal Y is used for further analysis, after an amplification which can be necessary as the case may be. The pictures of the video sequence are then reduced in the pixel resolution by way of applying the Gaussian pyramid or the Gaussian-Laplacian pyramid, and a band-pass filtering of the video sequence, thus of all individual pictures is further effected, in order to achieve a further data reduction, in particular in order to eliminate the frequency regions which are of no interest here. These frequency regions which are not of any interest and which are eliminated e.g. by way of low-pass filtering, are specified on the data base side, and are thus specified by way of the data base on the basis of the determined pump type as well as of the region to be examined. The determining of the optical flux between individual pictures is finally effected, for example by way of the Lucas-Kanade method, in order by way of this to obtain the determining of the speed of the changes between the pictures, so that the map is finally created in step 28, whose grey tones represent speeds of the optical flux and thus speeds of the changes between individual pictures.

In a step 29, actual speeds are then assigned to the grey scale fields 33, 34 of the map 28, whilst taking into account the exposure time of the individual pictures and the temporal interval of the individual pictures, and thus it is determined which regions oscillate at which frequency and amplitude. In step 30, the determined speeds are then compared to the allowable speeds of this region B which are stored on the data base side, and the region 31 of the map 28 is of relevance at all for the determining the condition is then transferred onto the smartphone 8 which on the display 9 displays a view according to FIG. 5, and the regions 32, in which the detected oscillations exceed an allowable value are displayed in this region 31.

Finally, in a step 33 after the analysis of the error condition, as is represented by way of FIG. 5, one or more hints are given on the display 9 to the user, as to what should be done in order to reduce these unallowably high oscillations. The hint for example can be that of reducing or increasing the speed of the pump, but can also be such as to indicate bearing damage which been some time in coming.

Although a signal examination as to whether the signal is suitable for evaluation, i.e. whether the video sequence is adequately long, whether all pictures comprise the region of interest and are adequately sharp, is basically envisaged after the transfer of the video sequence in step 26, however in the course of the digital picture processing, it can occur that the evaluation of the video signal provides no unambiguous results. The operator can be then prompted by the application on the smartphone, to once again take a video sequence and transmit it, so that the method is started afresh at step 26 and repeated.

While specific embodiments of the invention have been shown and described in detail to illustrate the application of the principles of the invention, it will be understood that the invention may be embodied otherwise without departing from such principles.

APPENDIX

Figure 6:
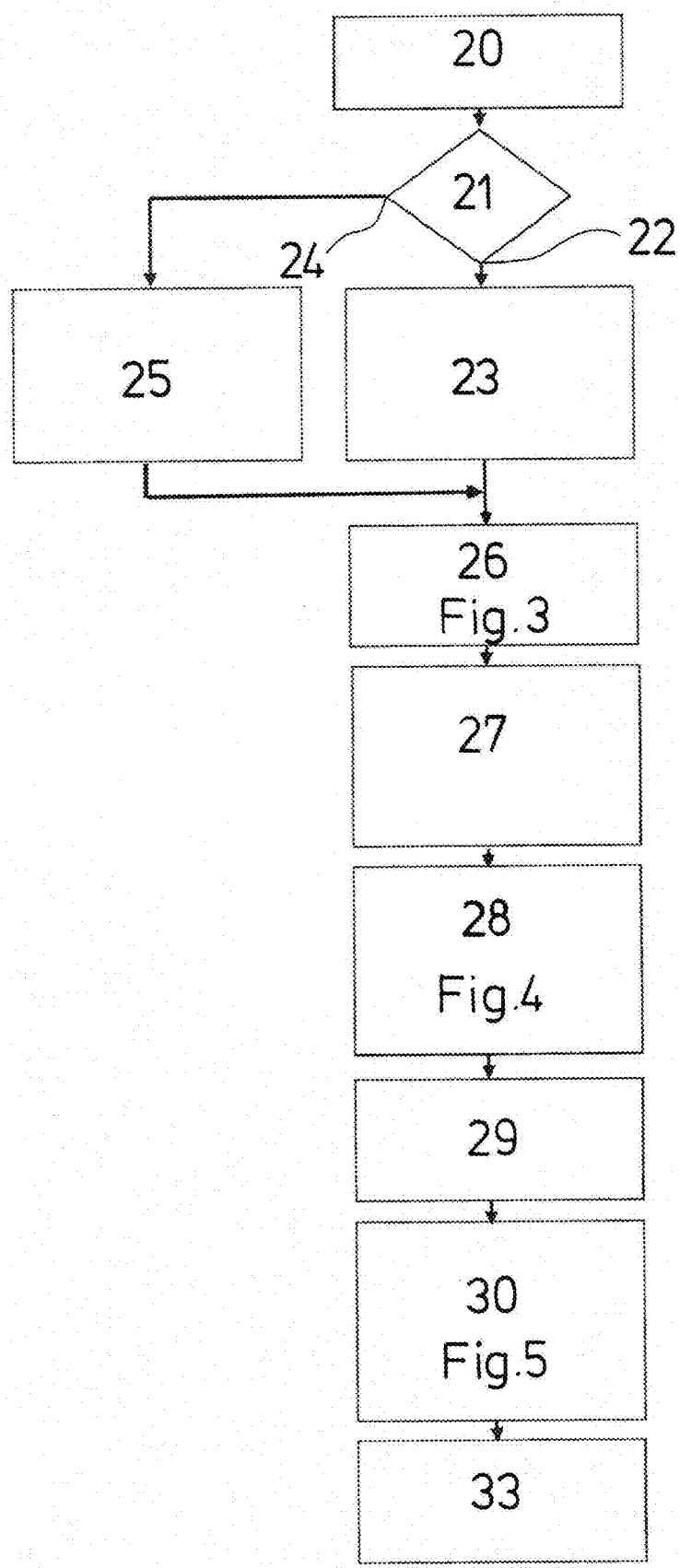
FIG. 6 is a procedural diagram concerning the method for determining the condition.

List of Reference Designations 1 pump assembly
2 centrifugal pump
3 electric motor
4 control
5 suction conduit
6 delivery conduit
7 operator, operating person
8 smartphone
9 display on 8
10 selected region
11 pump assembly according to FIG. 2
12 pump foot
13 inlet conduit connection
14 outlet conduit connection
15 cylindrical pump part
16 pump head
17 motor stool
18 electric moor
20 1st step in the procedural diagram according to FIG. 6
21 request
22 manual input
23 selection and prompting for the production of a video sequence of the selected region
24 further transfer for the automatic recognition
25 automatic recognition, selection of the region and prompting for the production of a video sequence
26 transfer of the video sequence to a server
27 digital picture processing
28 creation of a map indicating the optical flux or the speed of the change
29 speed assignment
30 display of the critical condition regions
31 allowable region of the evaluation
32 regions within the region 31, in which the allowable speed is exceeded
33 black fields in the map
34 white fields in the map

What is claimed is:

1. A method for detecting a condition of a pump assembly or a pump assembly part, the method comprising the steps of:
recording a video sequence of the pump assembly which is in operation, or recording a video sequence of at least one or more parts of the pump assembly; and
determining a condition of the pump assembly or one or more parts thereof based on changes in pictures of the video sequence, wherein a speed of changes between pixels or pixel groups of successive pictures of the video sequence are determined, and the determining of the condition of the pump assembly is effected on the basis of the determined speeds of changes, wherein the pixels or pixel groups are grouped or spatially assigned in a grouped manner, in accordance with the determined speeds of changes thereof, wherein the determined speed of changes and a spatial assignment of the determined changes are compared to values stored in a data base and the condition is determined on the basis of the comparison, wherein, on the basis of the comparison, it is determined whether and where predefined speed values are exceeded.

2. A method according to claim 1, wherein the changes in the pictures of the video sequence are determined by digital picture processing of the pictures of the video sequence.

3. A method according to claim 1, wherein the data base is a cloud-based data base and a device recording a video sequence of the pump assembly communicates with the cloud-based data base.

4. A method according to claim 1, wherein the exceeded predefined speed values are displayed on a display.

5. A method according to claim 1, wherein the recording of the video sequence and a transfer of the recorded data to a data base server is effected by way of a mobile computer based on a corresponding software application provided on the mobile computer, on which mobile computer a display of the condition is also effected.

6. A method according to claim 1, wherein:
the recording of the video sequence and a transfer of the recorded data to an external data base server is effected by way of a mobile computer based on a corresponding software application provided on the mobile computer, on which mobile computer a display of the condition is also effected; and
the determining of the speeds, the spatial assignment and a data-base-orientated evaluation are effected by way of digital picture processing algorithms on the external server and/or on the mobile computer.

7. A method according to claim 5, wherein at least one picture of the pump assembly or of a region of the pump assembly which is to be analyzed is taken, and used on the data base side for determining the pump assembly type by way of a comparison with picture data acquired on the data base side being effected, before or during the recording of the video sequence.

8. A method according to claim 7, wherein the pump assembly type and/or region of the pump assembly which is to be analyzed is inputted by way of the mobile computer, before the recording to the video sequence.

9. A method according to claim 2, wherein predefined speeds and frequency filters for the picture processing are determined on the data base side, after determining the pump assembly type and/or the region of a pump type which is to be analyzed.

10. A method according to claim 1, wherein a digital picture processing of the pictures of the video sequence is effected with one or more of the following steps:
converting the video sequence into a YUV signal, wherein the luminance signal Y is used for further analysis;
applying the Gaussian pyramid or the Gaussian-Laplacian pyramid to the individual pictures used for the analysis;
band-pass filtering the individual pictures/the video sequence after the data reduction;
determining optical flux by way of the Lucas-Kanade method and determining the speed of the changes;
creating a picture of the pump assembly and of the region to be analyzed, in accordance with the determined speeds and while taking into account a spatial assignment; and
displaying picture regions, in which the predefined speeds are exceeded.

11. A method according to claim 5, wherein the video sequence is firstly examined with regard to a spatial consistency of pictures of the video sequence, and a signal for repeating the recording of the video sequence is given to the mobile computer given a lack of consistency.

12. A method according to claim 1, wherein a data-base-assisted signal concerning a changed setting of the pump assembly and/or the replacement of components is provided after the effected determining of the condition and the determining of at least one region, in which the predefined speed of the change is exceeded.

13. A method according to claim 1, wherein sound is also recorded during the video recording, and a determining of the condition of the pump assembly is additionally effected by way of evaluating a sound sequence during the video recording.

14. A method according to claim 1, wherein the steps of recording a video sequence of the pump assembly and determining a condition of the pump assembly are repeated in temporal intervals, in order to detect condition changes of the pump assembly.

15. A method according to claim 1, wherein a type of the pump assembly is determined based on a comparison of picture data in the data base and at least one picture of the pump assembly or at least one picture of a region of the pump assembly.

16. A method for detecting a condition of a pump assembly or a pump assembly part, the method comprising the steps of:
providing a data base;
recording a video sequence of the pump assembly in an operating state or at least one part of the pump assembly;
determining a speed of changes between pixels or pixel groups of successive pictures of the video sequence, wherein the pixels or pixel groups are grouped or spatially assigned in a grouped manner, in accordance with the determined speeds of changes thereof;
comparing the determined speed of changes and a spatial assignment of the determined changes to values stored in the data base to provide a comparison;
determining a condition of the pump assembly or the at least one part thereof based on the comparison.

17. A method according to claim 16, wherein determining the condition of the pump assembly or the at least one part thereof based on the comparison includes determining whether and where predefined speed values are exceeded.

18. A method according to claim 17, wherein the changes in the pictures of the video sequence are determined by digital picture processing of the pictures of the video sequence.

19. A method according to claim 17, wherein the data base is a cloud-based data base and a device recording a video sequence of the pump assembly communicates with the cloud-based data base.

20. A method according to claim 16, wherein a type of the pump assembly is determined based on a comparison of picture data in the data base and at least one picture of the pump assembly or at least one picture of a region of the pump assembly.

* * * * *